(12) United States Patent
Akima

(10) Patent No.: US 12,424,035 B2
(45) Date of Patent: Sep. 23, 2025

(54) DRIVING DIAGNOSTIC DEVICE, DRIVING DIAGNOSTIC SYSTEM, DRIVING DIAGNOSTIC METHOD, AND STORAGE MEDIUM

(71) Applicant: TOYOTA JIDOSHA KABUSHIKI KAISHA, Aichi-ken (JP)

(72) Inventor: Satoshi Akima, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 259 days.

(21) Appl. No.: 18/307,007

(22) Filed: Apr. 26, 2023

(65) Prior Publication Data
US 2023/0419749 A1  Dec. 28, 2023

(30) Foreign Application Priority Data
Jun. 27, 2022  (JP) .................................. 2022-102957

(51) Int. Cl.
G07C 5/08  (2006.01)
(52) U.S. Cl.
CPC .................................. *G07C 5/0808* (2013.01)

(58) Field of Classification Search
CPC ........ G07C 5/0808; B60W 2510/1005; B60W 30/18036; B60W 2520/10; B60W 50/0205
See application file for complete search history.

(56) References Cited

FOREIGN PATENT DOCUMENTS

| JP | 2013-191060 A | 9/2013 |
| JP | 2016-57490 A | 4/2016 |
| JP | 2021-149734 A | 9/2021 |

*Primary Examiner* — Michael V Kerrigan
(74) *Attorney, Agent, or Firm* — HAUPTMAN HAM, LLP

(57) ABSTRACT

Provided is a driving diagnostic unit that performs driving diagnostics related to a reverse operation of a vehicle based on a maximum value of a duration and a second threshold value, the duration being a time during which a vehicle speed of the vehicle in at least one of a time period between a first time before a switching time at which a shift lever of the vehicle is moved from a shift position other than an R range to the R range by a predetermined time and the switching time and a time period between a second time after the switching time by a predetermined time and the switching time continues to be a first threshold value or less.

7 Claims, 10 Drawing Sheets

FIG. 5

| CATEGORY | OPERATION TARGET | SCENE | SPECIFIC DETECTION VALUE | EXTRACTION CONDITION | KPI |
|---|---|---|---|---|---|
| SAFETY | SHIFT LEVER | REVERSE OPERATION | VEHICLE SPEED | CONDITION 1 | MAXIMUM VALUE OF DURATION |
| | ACCELERATOR PEDAL | TOTAL OPERATION | ACCELERATOR PEDAL OPERATION AMOUNT | CONDITION 2 | MAXIMUM ACCELERATOR PEDAL OPERATION AMOUNT |
| | STEERING | CURVE OPERATION | STEERING ANGLE | CONDITION 3 | ACCELERATION OF STEERING ANGLE |
| COMFORT | BRAKE PEDAL | TOTAL OPERATION | VEHICLE WHEEL SPEED | CONDITION 4 | AVERAGE JERK VALUE |

DRIVING DIAGNOSTIC DEVICE, DRIVING
DIAGNOSTIC SYSTEM, DRIVING
DIAGNOSTIC METHOD, AND STORAGE
MEDIUM

CROSS-REFERENCE TO RELATED APPLICATION

This application claims priority to Japanese Patent Application No. 2022-102957 filed on Jun. 27, 2022, incorporated herein by reference in its entirety.

BACKGROUND

1. Technical Field

The present disclosure relates to a driving diagnostic device, a driving diagnostic system, a driving diagnostic method, and a storage medium.

2. Description of Related Art

Japanese Unexamined Patent Application Publication No. 2016-57490 (JP 2016-57490 A) discloses a driver assistance system that automatically reproduces a teacher video including a virtual field of view video corresponding to the driver's field of view at the end of driving when a dangerous situation is detected during driving is detected.

SUMMARY

In JP 2016-57490 A, the driving diagnostics when a reverse operation is performed cannot be performed by a simple method without using a camera, etc.

In view of the above facts, it is an object of the present disclosure to provide a driving diagnostic device, a driving diagnostic system, a driving diagnostic method, and a storage medium capable of performing the driving diagnostics when a reverse operation is performed, by a simple method without using a camera, etc.

A driving diagnostic device according to claim 1 includes a driving diagnostic unit that performs driving diagnostics related to a reverse operation of a vehicle based on a maximum value of a duration and a second threshold value, the duration being a time during which a vehicle speed of the vehicle in at least one of a time period between a first time before a switching time at which a shift lever of the vehicle is moved from a shift position other than an R range to the R range by a predetermined time and the switching time and a time period between a second time after the switching time by a predetermined time and the switching time continues to be a first threshold value or less.

The driving diagnostic device according to claim 1 performs the driving diagnostics related to the reverse operation of the vehicle based on the maximum value of the duration and the second threshold value, the duration being a time in which the vehicle speed of the vehicle in at least one of the time period between the first time before the switching time at which the shift lever of the vehicle is moved from a shift position other than the R range to the R range by a predetermined time and the switching time and the time period between the second time after the switching time by a predetermined time and the switching time continues to be the first threshold value or less. When the maximum value of the duration is the second threshold value or more, it is conceivable that the driver of the vehicle is highly likely to visually check the rear for a sufficient period of time. In this manner, the driving diagnostic device according to claim 1 can perform the driving diagnostics when the reverse operation is performed, by a simple method without using a camera or the like.

In the driving diagnostic device of the disclosure according to claim 2, in the disclosure according to claim 1, the driving diagnostic unit performs the driving diagnostics based on the maximum value in a time period between the first time and the second time and the second threshold value.

In the disclosure according to claim 2, the driving diagnostic device performs the driving diagnostics based on the maximum value of the duration in the time period between the first time and the second time and the second threshold value. It is conceivable that, when the maximum value of the duration in the time period between the first time and the second time is the second threshold value or more, the driver is highly likely to check the rear for a sufficient period of time before the driver moves the shift lever to the R range, after the driver moves the shift lever to the R range, or while the driver is moving the shift lever to the R range. Therefore, the driving diagnostic device according to claim 2 can perform the driving diagnostics when the reverse operation is performed, by a simple method without using a camera or the like.

In the driving diagnostic device of the disclosure according to claim 3, in the disclosure according to claim 1, the driving diagnostic unit performs the driving diagnostics based on the maximum value in a time period between the first time and the switching time and the second threshold value.

In the disclosure according to claim 3, the driving diagnostic device performs the driving diagnostics based on the maximum value of the duration in the time period between the first time and the switching time and the second threshold value. It is conceivable that, when the maximum value of the duration in the time period between the first time and the switching time is the second threshold value or more, the driver is highly likely to check the rear for a sufficient period of time before the driver moves the shift lever to the R range. Therefore, the driving diagnostic device according to claim 3 can perform the driving diagnostics when the reverse operation is performed, by a simple method without using a camera or the like.

In the driving diagnostic device of the disclosure according to claim 4, in the disclosure according to claim 1, the driving diagnostic unit performs the driving diagnostics based on the maximum value in a time period between the switching time and the second time and the second threshold value.

In the disclosure according to claim 4, the driving diagnostic device performs the driving diagnostics based on the maximum value of the duration in the time period between the switching time and the second time and the second threshold value. It is conceivable that, when the maximum value of the duration in the time period between the switching time and the second time is the second threshold value or more, the driver is highly likely to check the rear for a sufficient period of time after the driver moves the shift lever to the R range. Therefore, the driving diagnostic device according to claim 4 can perform the driving diagnostics when the reverse operation is performed, by a simple method without using a camera or the like.

A driving diagnostic system of the disclosure according to claim 5 includes: a shift position sensor that detects a shift position of the shift lever; a vehicle speed sensor that detects the vehicle speed; and the driving diagnostic unit according to claim 1 or 2.

A driving diagnostic method of the disclosure according to claim 6 includes a step of performing driving diagnostics related to a reverse operation of a vehicle based on a maximum value of a duration and a second threshold value, the duration being a time during which a vehicle speed of the vehicle in at least one of a time period between a first time before a switching time at which a shift lever of the vehicle is moved from a shift position other than an R range to the R range by a predetermined time and the switching time and a time period between a second time after the switching time by a predetermined time and the switching time continues to be a first threshold value or less.

A storage medium storing a program of the disclosure according to claim 7 causes a computer to execute a process of performing driving diagnostics related to a reverse operation of a vehicle based on a maximum value of a duration and a second threshold value, the duration being a time during which a vehicle speed of the vehicle in at least one of a time period between a first time before a switching time at which a shift lever of the vehicle is moved from a shift position other than an R range to the R range by a predetermined time and the switching time and a time period between a second time after the switching time by a predetermined time and the switching time continues to be a first threshold value or less.

As described above, the driving diagnostic device, the driving diagnostic system, the driving diagnostic method, and the storage medium according to the present disclosure have a superior effect that the driving diagnostics when a reverse operation is performed can be performed by a simple method without using a camera, etc.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing a scene list;

DETAILED DESCRIPTION OF EMBODIMENTS

Figure 1:
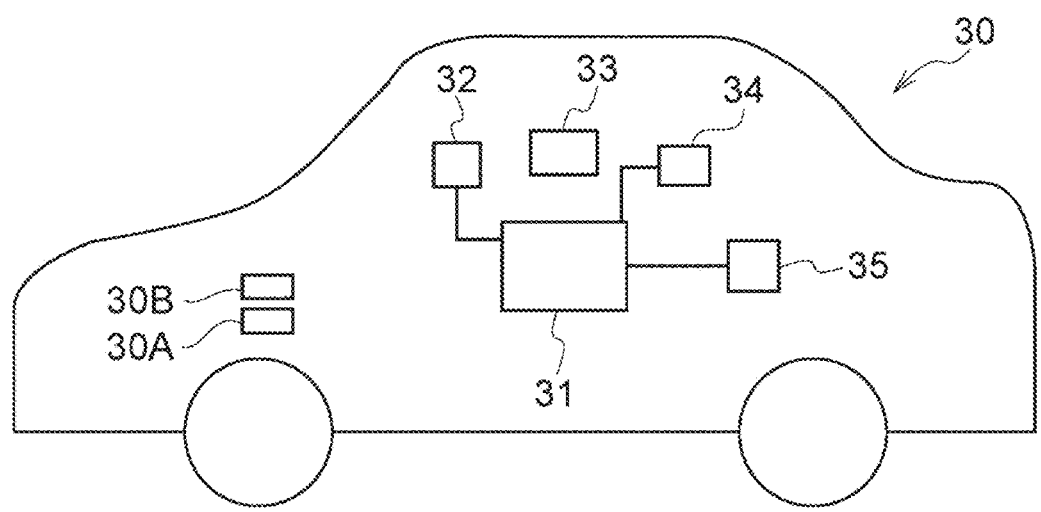
FIG. 1 is a diagram showing a vehicle capable of transmitting a detection value to a driving diagnostic device according to an embodiment.

Hereinafter, an embodiment of a driving diagnostic device 10, a driving diagnostic system 100, a driving diagnostic method, and a storage medium according to the present disclosure will be described with reference to the drawings. The driving diagnostic system 100 (hereinafter referred to as a system 100) according to the present embodiment includes the driving diagnostic device 10, a vehicle 30, and a mobile terminal 50.

As shown in FIG. 1, the vehicle 30 capable of data communication with the driving diagnostic device 10 via a network includes an electronic control unit (ECU) 31, a vehicle speed sensor 32, a shift lever 33, a shift lever position sensor 34, and a global positioning system (GPS) receiver 35. A vehicle identification (ID) is assigned to the vehicle 30 capable of receiving diagnostics by the driving diagnostic device 10. The vehicle speed sensor 32, the shift lever position sensor 34 and the GPS receiver 35 are connected to the ECU 31. The ECU 31 includes a central processing unit (CPU), a read-only memory (ROM), a random access memory (RAM), a storage, a wireless communication interface (I/F), and an input-output I/F. The CPU, the ROM, the RAM, the storage, the communication I/F, and the input-output I/F of the ECU 31 are connected to each other via a bus so as to be able to communicate with each other. The CPU of the ECU 31 controls each configuration and executes various arithmetic processes (information processes) in accordance with the program recorded in the ROM or the storage (storage medium). Further, the CPU can acquire information related to the date and time from a timer (not shown). The ROM, the RAM, the storage, the communication I/F, and the input-output I/F of the ECU 31 have the same configurations and functions as those of a read-only memory (ROM) 12B, a random access memory (RAM) 12C, a storage 12D, a communication interface (I/F) 12E, and an input-output I/F 12F of a first server 12 to be described later, respectively. Details of these functions will be described later. The above network includes a communication network of a telecommunications carrier and the Internet network. The vehicle 30, the first server 12, a fourth server 18, and the mobile terminal 50, which will be described later, perform data communication via the network.

The vehicle 30 includes a steering (not shown). Further, as shown in FIG. 1, the vehicle 30 includes an accelerator pedal 30A and a brake pedal 30B. When the foot of the driver of the vehicle 30 depresses the accelerator pedal 30A, the ECU 31 controls a drive source (not shown) of the vehicle 30. The drive source of vehicle 30 includes at least one of an internal combustion engine and an electric motor. When the foot of the driver depresses the brake pedal 30B, the ECU 31 controls a brake device (not shown) of the vehicle 30.

The vehicle 30 is provided with the vehicle speed sensor 32 that detects a vehicle speed of the vehicle 30. The shift lever 33 provided in the vehicle 30 is movable to each of shift positions of a drive (D) range, a reverse (R) range, a parking (P) range, and a neutral (N) range. That is, the vehicle 30 is an automatic vehicle (AT vehicle). The shift lever position sensor 34 detects the shift position of the shift lever 33. As is well known, when the shift lever 33 is in the D range, the vehicle 30 can travel forward with the driving force of the drive source. When the shift lever 33 is in the R range, the vehicle 30 can travel in reverse with the driving force of the drive source. The GPS receiver 35 acquires information on a position where the vehicle 30 is traveling (hereinafter, referred to as "position information") by receiving a GPS signal transmitted from a GPS satellite. Detection values detected by the vehicle speed sensor 32 and the shift lever position sensor 34 are transmitted to the ECU 31 via a controller area network (CAN) provided in the vehicle 30 and stored in a storage of the ECU 31 while the detection values are associated with time information indicating the detected time and the position information.

Figure 2:
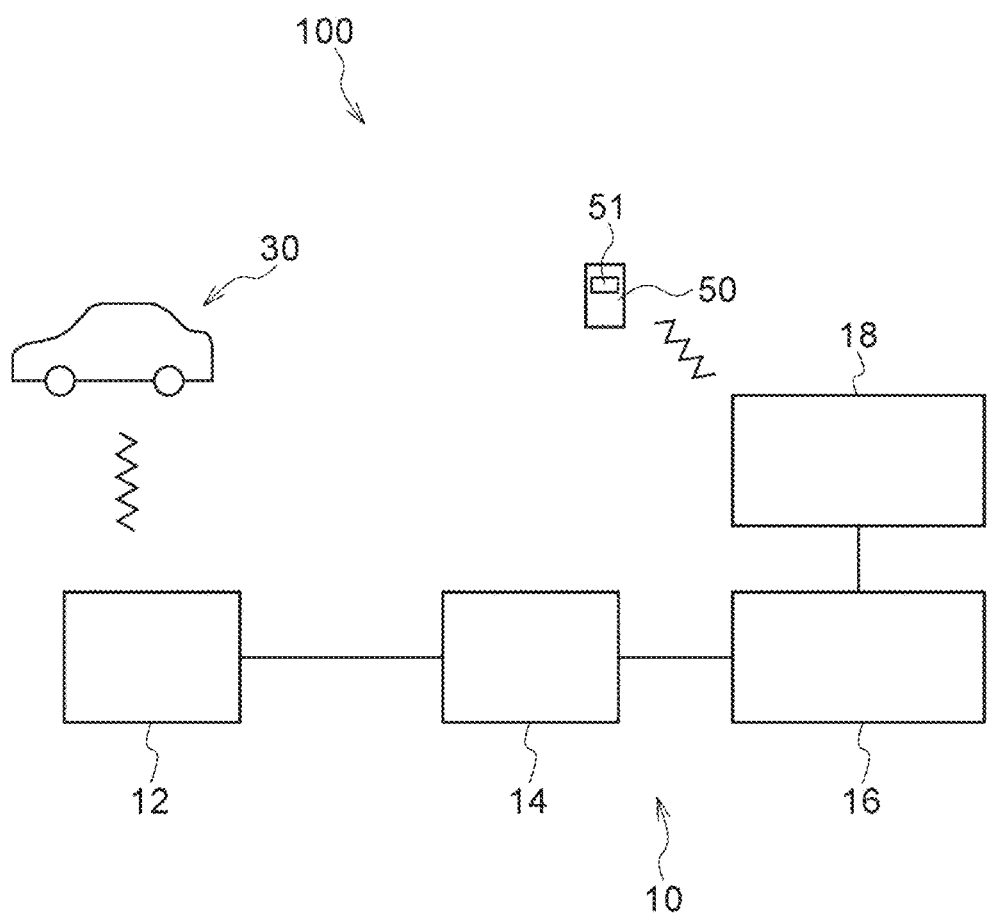
FIG. 2 is a diagram showing a driving diagnostic system provided with the driving diagnostic device, a vehicle, and a mobile terminal.

As shown in FIG. 2, the driving diagnostic device 10 includes the first server 12, a second server (driving diagnostic unit) 14, a third server 16, and the fourth server 18. For example, the first server 12, the second server 14, the third server 16, and the fourth server 18 are arranged in one building. The first server 12 and the fourth server 18 are connected to the above network. The first server 12 and the second server 14 are connected by a local area network (LAN). The second server 14 and the third server 16 are connected by the LAN. The third server 16 and the fourth server 18 are connected by the LAN. That is, the driving diagnostic device 10 is constructed as a cloud computing system.

Figure 3:
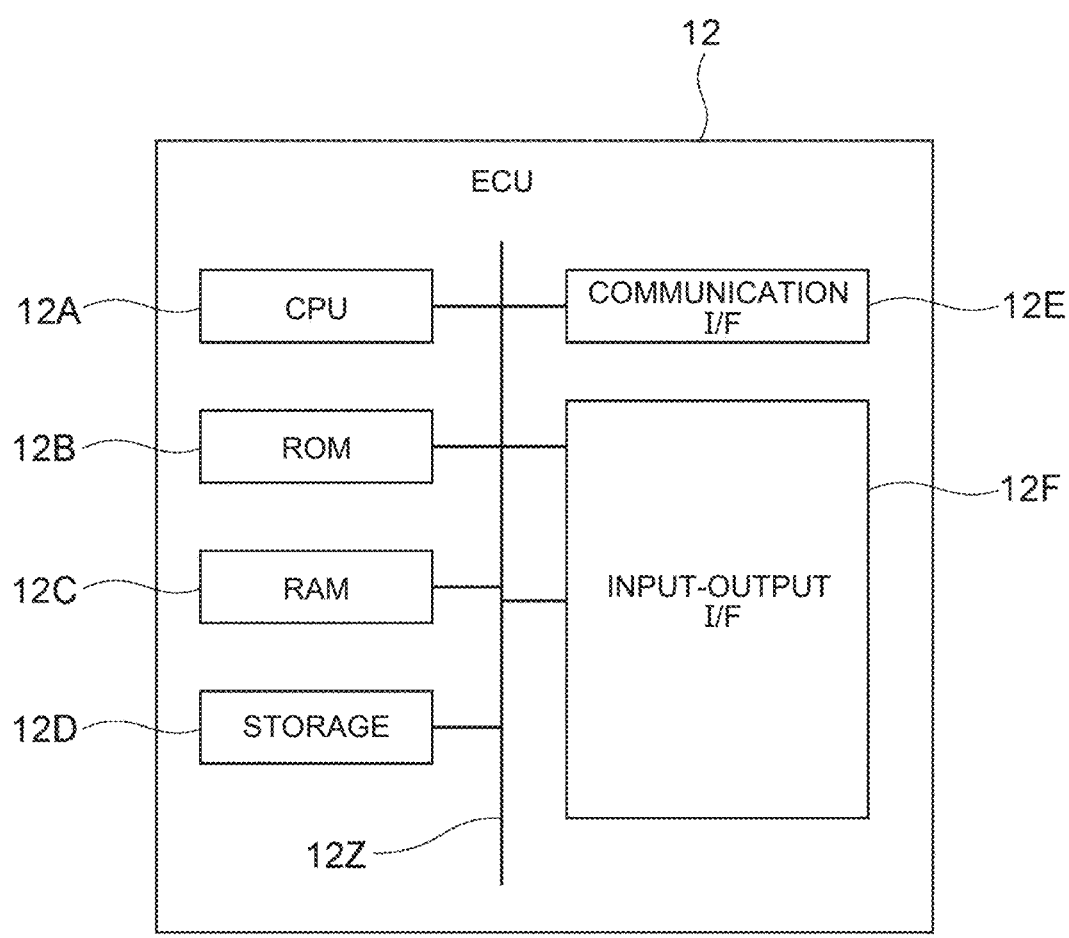
FIG. 3 is a control block diagram of a first server of the driving diagnostic device shown in FIG. 2.

As shown in FIG. 3, the first server 12 is configured to include a central processing unit (CPU: processor) 12A, the ROM 12B, the RAM 12C, the storage 12D, the communication I/F 12E, and the input-output I/F 12F. The CPU 12A, the ROM 12B, the RAM 12C, the storage 12D, the communication I/F 12E, and the input-output I/F 12F are connected via a bus 12Z so as to be able to communicate with each other. The first server 12 can acquire information on the date and time from a timer (not shown).

The CPU 12A is a central processing unit that executes various programs and that controls various units. That is, the CPU 12A reads the program from the ROM 12B or the storage 12D and executes the program using the RAM 12C as a work area. The CPU 12A controls each configuration and executes various arithmetic processes (information processes) in accordance with the program recorded in the ROM 12B or the storage 12D.

The ROM 12B stores various programs and various data. The RAM 12C temporarily stores a program or data as a work area. The storage 12D is composed of a storage device such as a hard disk drive (HDD) or a solid state drive (SSD), and stores various programs and various data. The communication OF I/F 12E is an interface for the first server 12 to communicate with other devices. The input-output I/F 12F is an interface for communicating with various devices.

Detection value data that is data representing the detection values detected by the vehicle speed sensor 32, the shift lever position sensor 34, and the GPS receiver 35 of the vehicle 30 are transmitted from the communication I/F of the vehicle 30 to the communication I/F 12E of the first server 12 via the network above every time a predetermined time elapses, and the detection value data is recorded in the storage 12D. All of the detection value data recorded in the storage 12D include information on a vehicle identification (ID), the time information, and the position information.

The basic configurations of the second server 14, the third server 16, and the fourth server 18 are the same as the configuration of the first server 12.

Figure 4:
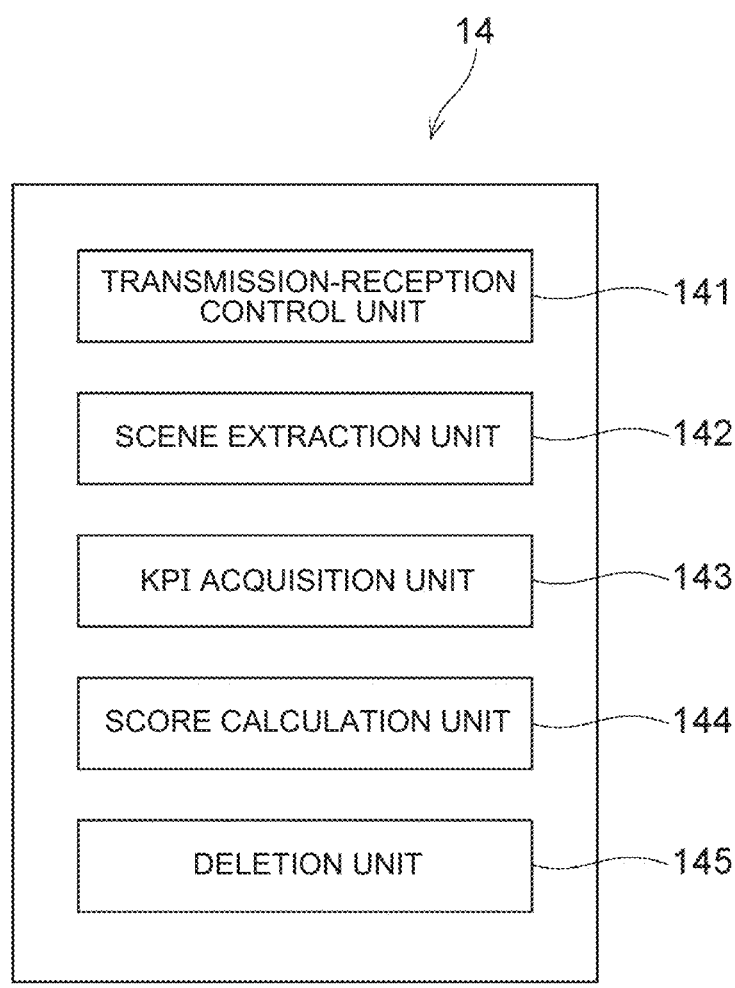
FIG. 4 is a functional block diagram of a second server shown in FIG. 2.

FIG. 4 is a block diagram showing an example of a functional configuration of the second server 14. The second server 14 includes a transmission-reception control unit 141, a scene extraction unit 142, a key performance indicator (KPI) acquisition unit 143, a score calculation unit 144, and a deletion unit 145 as functional configurations. The transmission-reception control unit 141, the scene extraction unit 142, the KPI acquisition unit 143, the score calculation unit 144, and the deletion unit 145 are realized by the CPU of the second server 14 reading and executing the program stored in the ROM.

The transmission-reception control unit 141 controls the communication I/F of the second server 14. The communication I/F of the second server 14 transmits and receives information to and from the communication I/Fs of the first server 12 and the third server 16 via the LAN. The detection value data recorded in the storage 12D of the first server 12 are transmitted to the communication I/F of the second server 14 while being associated with the vehicle ID, the time information, and the position information. The detection value data transmitted from the first server 12 to the second server 14 include a data group acquired during a predetermined data detection period. This data detection period is, for example, 30 minutes. Hereinafter, the data group that corresponds to one vehicle ID and that is acquired during the data detection period will be referred to as a "detection value data group". The detection value data group recorded in the first server 12 is transmitted to the communication I/F of the second server 14 in order from the oldest acquired time. More specifically, as will be described later, when the detection value data group is deleted from the storage of the second server 14, a newer detection value data group than the deleted detection value data group is transmitted from the first server 12 to the second server 14 and this new detection value data group is stored in the storage of the second server 14.

The scene extraction unit 142 identifies the detection value data group stored in the storage of the second server 14 into data representing the specific detection value and other data. More specifically, the scene extraction unit 142 treats the data necessary for acquiring the KPI, which will be described later, as the data representing the specific detection value.

FIG. 5 is a scene list 22 recorded in the ROM of the second server 14. The scene list 22 is defined based on the operation contents of various operation members of the vehicle 30. The categories that are the largest items in the scene list 22 are "safety" and "comfort". The operation members defined in the scene list 22 include, for example, the shift lever 33, accelerator pedal 30A, brake pedal 30B, and steering.

When an extraction condition 1 included in the category "safety" is satisfied, the scene extraction unit 142 extracts a detection value detected by the vehicle speed sensor 32 in a specific time period Ts (refer to FIGS. 6 to 8) including the time when the extraction condition 1 is satisfied from the detection value data group stored in the storage of the second server 14 as data representing the specific detection value. Here, the extraction condition 1 is satisfied when the shift lever position sensor 34 outputs a signal indicating that the shift lever 33 has moved from a shift position other than the R range to the R range. Further, the time when the shift lever position sensor 34 outputs the signal is referred to as switching time Tc (see FIGS. 6 to 8). The specific time period Ts is a time period between a first time T1 (see FIGS. 6 to 8) before a switching time Tc by a first time and a second time T2 (see FIGS. 6 to 8) after the switching time Tc by a second time. For example, the first time and the second time are three seconds. That is, for example, the specific time period Ts is six seconds. However, the first time and the second time may be different lengths of time than three seconds.

As shown in FIG. 5, the "safety" category of the scene list 22 includes extraction conditions different from the extraction condition 1, and the "comfort" category also includes an extraction condition different from the extraction condition 1. These extraction conditions are associated with scenes, specific detection values, and KPIs related to the accelerator pedal 30A, the brake pedal 30B, and the steering. The detailed description thereof will be omitted.

When any of the extraction conditions listed in the scene list 22 are satisfied, the KPI acquisition unit 143 acquires (calculates) the KPI corresponding to the satisfied extraction condition.

For example, when the extraction condition 1 related to the shift lever 33 is satisfied, the KPI acquisition unit 143 obtains a duration that is a time period during which the vehicle speed continues to be a first threshold value or less in the specific time period TS based on data (specific detection value) related to the vehicle speed detected by the vehicle speed sensor 32. Furthermore, the KPI acquisition unit 143 acquires the maximum value of the duration in the specific time period Ts as a KPI. The first threshold value is, for example, 1 km/h.

Figure 6:
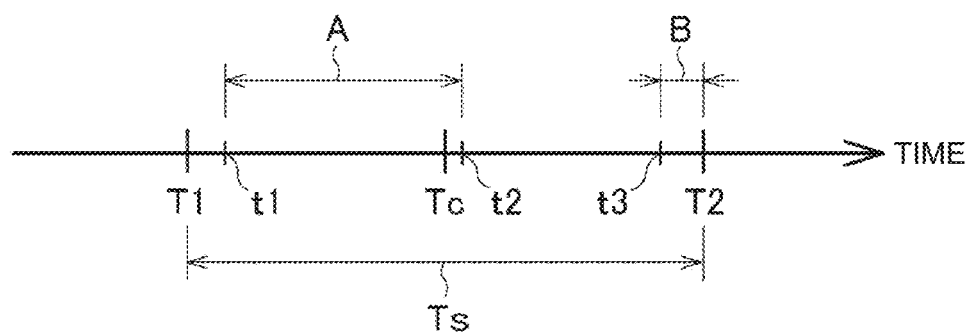
FIG. 6 is a diagram showing an example of the relationship between the timing at which a shift lever is moved to the R range and the timing at which a driver checks the rear.

For example, as shown in FIG. 6, the vehicle continues to be the first threshold value or less in a time period A between time t1 after a first time T1 and time t2 after the switching time Tc and in a time period B between time t3 before the second time T2 and the second time T2, and the time period A is longer than the time period B. In this case, the maximum value of the duration is the length of time period A. Therefore, the KPI acquisition unit 143 acquires the length of time period A as a KPI. Furthermore, the KPI acquisition unit 143 compares the length of time period A that is the maximum value of the duration with a predetermined second threshold value. Note that the second threshold value is, for example, two seconds. Here, it is assumed that the length of time period A is equal to or larger than the second threshold value. In this case, it is highly likely that the driver of the vehicle 30 visually checks the rear in the time period A and releases the foot from the brake pedal 30B at the time t2. That is, it is highly likely that the driver moves the shift lever 33 from a shift position other than the R range to the R range after the driver substantially performs the visual check of the rear for a sufficient period of time. Further, it is highly likely that the vehicle 30 moves in reverse due to the accelerator pedal 30A being depressed or a creep phenomenon between the time t2 and the time t3, and the brake pedal 30B is depressed at the time t3.

Figure 7:
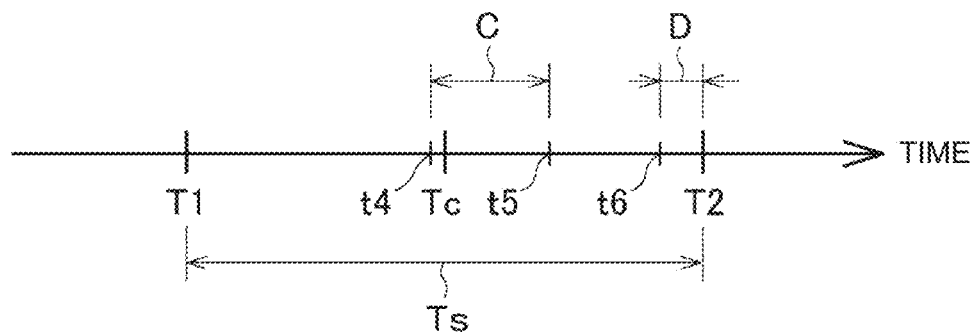
FIG. 7 is a diagram showing another example of the relationship between the timing at which the shift lever is moved to the R range and the timing at which the driver checks the rear, which is different from FIG. 6.

Further, as shown in FIG. 7, it is assumed that the vehicle continues to be the first threshold value or less in a time period C between time t4 before the switching time Tc and time t5 after the switching time Tc and in a time period D between time t6 before the second time T2 and the second time T2, and the time period C is longer than the time period D. In this case, the maximum value of the duration is the length of time period C. Therefore, the KPI acquisition unit 143 acquires the length of time period C as a KPI. Furthermore, the KPI acquisition unit 143 compares the length of time period C that is the maximum value of the duration with the second threshold value. Here, it is assumed that the length of time period C is equal to or larger than the second threshold value. In this case, it is highly likely that the driver of the vehicle 30 visually checks the rear in the time period C and releases the foot from the brake pedal 30B at the time t5. That is, it is highly likely that the driver visually checks the rear for a sufficient period of time after the driver moves the shift lever 33 from a shift position other than the R range to the R range. Further, it is highly likely that the vehicle 30 moves in reverse due to the accelerator pedal 30A being depressed or a creep phenomenon between the time t5 and the time t6, and the brake pedal 30B is depressed at the time t6.

Figure 8:
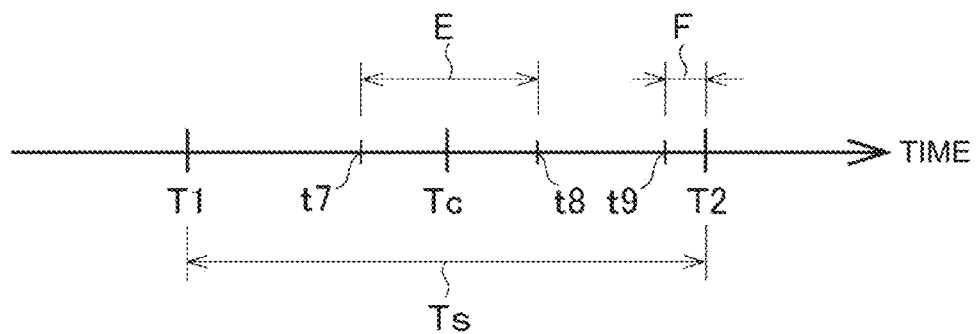
FIG. 8 is a diagram showing another example of the relationship between the timing at which the shift lever is moved to the R range and the timing at which the driver checks the rear, which is different from FIGS. 6 and 7.

Further, as shown in FIG. 8, it is assumed that the vehicle continues to be the first threshold value or less in a time period E between time t7 before the switching time Tc and time t8 after the switching time Tc and in a time period F between time t9 before the second time T2 and the second time T2, and the time period E is longer than the time period F. In this case, the maximum value of the duration is the length of time period E. Therefore, the KPI acquisition unit 143 acquires the length of time period E as a KPI. Furthermore, the KPI acquisition unit 143 compares the length of time period E that is the maximum value of the duration with the second threshold value. Here, it is assumed that the length of time period E is equal to or larger than the second threshold value. In this case, it is highly likely that the driver of the vehicle 30 visually checks the rear in the time period E and releases the foot from the brake pedal 30B at the time t8. That is, it is highly likely that the driver moves the shift lever 33 from a shift position other than the R range to the R range while the driver substantially performs the visual check of the rear for a sufficient period of time. Further, it is highly likely that the vehicle 30 moves in reverse due to the accelerator pedal 30A being depressed or a creep phenomenon between the time t8 and the time t9, and the brake pedal 30B is depressed at the time t9.

Note that, when the maximum value of the duration is less than the second threshold value, it is highly likely that the driver causes the vehicle 30 to move in reverse without visually checking the rear for a sufficient period of time.

As will be described later, the score calculation unit 144 calculates the safety level score, the comfort level score, and the driving operation score based on the calculated KPI.

When the scene extraction unit 142, the KPI acquisition unit 143, and the score calculation unit 144 complete the above process for one detection value data group recorded in the storage, data related to the safety level score, comfort level score, and driving operation score that are acquired are transmitted from the communication I/F of the second server 14 to the communication I/F of the third server 16, together with information of the vehicle ID.

When the scene extraction unit 142, the KPI acquisition unit 143, and the score calculation unit 144 complete the above process for one detection value data group, the deletion unit 145 deletes the detection value data group from the storage of the second server 14.

The communication I/F of the third server 16 receives data related to the safety level score, the comfort level score, and the driving operation score transmitted from the second server 14. The data received by the communication I/F of the third server 16 is recorded in the storage of the third server 16.

The fourth server 18 at least functions as a Web server and a web application (Web App) server. The communication I/F of the fourth server 18 receives data transmitted from the communication I/F of the third server 16 and records the received data in storage.

The mobile terminal 50 shown in FIG. 2 includes a CPU, a ROM, a RAM, a storage, a communication I/F, and an input-output I/F. The mobile terminal 50 is, for example, a smartphone or a tablet computer. The CPU, the ROM, the RAM, the storage, the communication I/F, and the input-output I/F of the mobile terminal 50 are connected to each other via a bus so as to be able to communicate with each other. The mobile terminal 50 is provided with a display unit 51 having a touch panel. The display unit 51 is connected to an input-output I/F of the mobile terminal 50.

The mobile terminal 50 is owned by, for example, the driver of the vehicle 30 assigned with the vehicle ID. A predetermined driving diagnostic display application is installed on the mobile terminal 50. The communication I/F of the mobile terminal 50 can wirelessly communicate with the communication I/F of the fourth server 18. That is, the communication I/F of the mobile terminal 50 can transmit and receive data to and from the communication I/F of the fourth server 18. The display unit 51 controlled by the CPU displays, for example, information received by the communication I/F from the communication I/F of the fourth server 18 and information input via the touch panel. Information input through the touch panel can be transmitted from the communication I/F of the mobile terminal 50 to the communication I/F of the fourth server 18.

Operation and Effects

Next, the operation and effects of the present embodiment will be described.

First, the flow of processes executed by the CPU of the second server 14 (hereinafter referred to as a second CPU) will be described using the flowchart in FIG. 9. The second CPU repeatedly executes the process of the flowchart shown in FIG. 9 every time a predetermined time elapses.

First, in step S10 (hereinafter, the term "step" is omitted), the transmission-reception control unit 141 of the second server 14 determines whether the communication I/F receives the detection value data group from the first server 12. In other words, the transmission-reception control unit 141 determines whether the detection value data group is recorded in the storage of the second server 14.

When the determination result is Yes in S10, the CPU proceeds to S11, and the scene extraction unit 142 extracts data representing the specific detection value satisfying the extraction condition from the detection value data group stored in the storage. Further, the KPI acquisition unit 143 acquires (calculates) each KPI based on the data representing the extracted specific detection value.

The second CPU that has completed the process in S11 proceeds to S12, and the score calculation unit 144 calculates the safety level score, the comfort level score, and the driving operation score.

For example, when the KPI (maximum value of the duration) that is acquired when the extraction condition 1 in FIG. 5 is satisfied is the second threshold value or more, the score for this KPI is 100 points. In contrast, when this KPI is less than the second threshold value, the score for this KPI is 1 point.

Note that when an extraction condition other than the extraction condition 1 is satisfied, the score calculation unit 144 calculates the score related to the KPI of each operation target.

Furthermore, the score calculation unit 144 calculates the safety level score and the comfort level score. The value (average value) acquired by dividing the total score of each KPI corresponding to the extraction condition 1 to the extraction condition 3 by the number of items (3) in the category "safety" is the safety level score. In the present embodiment, since the number of items in the category "comfort" is "1", the score related to the KPI corresponding to the extraction condition 4 is the comfort level score.

Further, the score calculation unit 144 calculates the driving operation score based on the calculated safety level score and comfort level score. Specifically, the score calculation unit 144 acquires the value (average value) obtained by dividing the total score of the safety level score and the comfort level score by the sum (4) of the items of the safety level score and the comfort level score as the driving operation score.

The second CPU that has completed the process in S12 proceeds to S13, and the communication I/F transmits the data related to the safety level score, the comfort level score, and the driving operation score to the third server 16, together with the information related to the vehicle ID.

The second CPU that has completed the process in S13 proceeds to S14, and the deletion unit 145 deletes the detection value data group from the storage of the second server 14.

Figure 9:
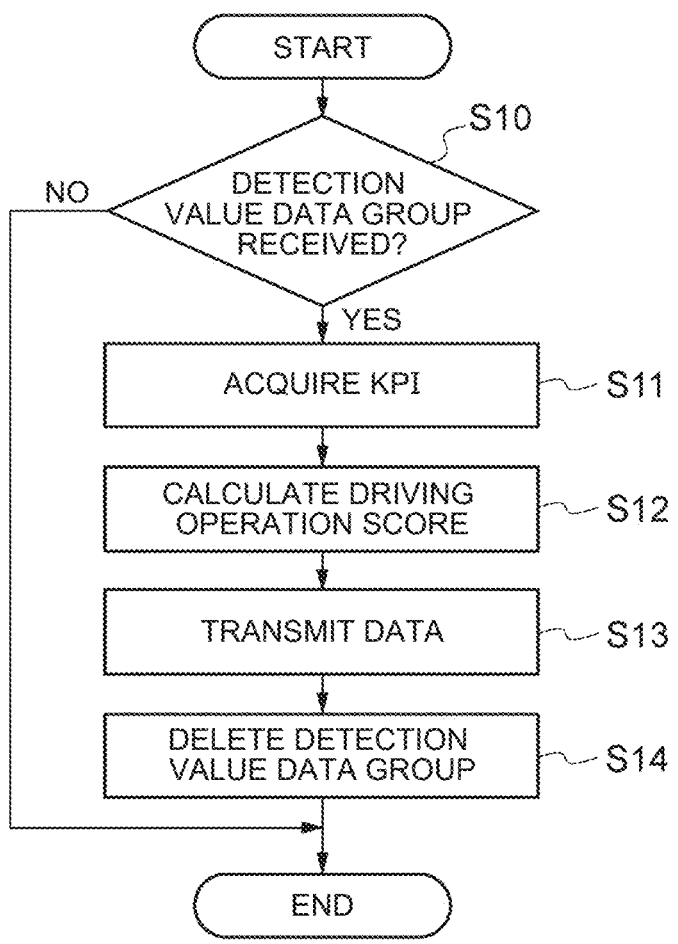
FIG. 9 is a flowchart showing processes executed by a second server.

When the determination result is No in S10 or when the process in S14 is completed, the second CPU temporarily ends the process of the flowchart shown in FIG. 9.

Next, the flow of processes executed by the CPU of the fourth server 18 (hereinafter referred to as a fourth CPU) will be described using the flowchart in FIG. 10. The fourth CPU repeatedly executes the process of the flowchart shown in FIG. 10 every time a predetermined time elapses.

First, in S20, the fourth CPU of the fourth server 18 determines whether a display request is transmitted from the communication I/F of the mobile terminal 50 in which the driving diagnostic display application is running to the communication I/F of the fourth server 18. That is, the fourth CPU determines whether an access operation from the mobile terminal 50 is performed. The display request includes information on the vehicle ID associated with the mobile terminal 50.

When the determination result is Yes in S20, the fourth CPU proceeds to S21 and the communication I/F of the fourth server 18 communicates with the third server 16. The communication I/F of the fourth server 18 receives, from the communication I/F of the third server 16, data related to the safety level score, the comfort level score, and the driving operation score corresponding to the vehicle ID associated with the mobile terminal 50 that has transmitted the display request.

The fourth CPU that has completed the process in S21 proceeds to S22, and generates data representing a driving diagnostic result image 55 (see FIG. 12) using the data received in S21. The driving diagnostic result image 55 can be displayed on the display unit 51 of the mobile terminal 50 in which the driving diagnostic display application is running.

The fourth CPU that has completed the process in S22 proceeds to S23, and the communication I/F of the fourth server 18 transmits the data generated in S22 to the communication I/F of the mobile terminal 50.

Figure 10:
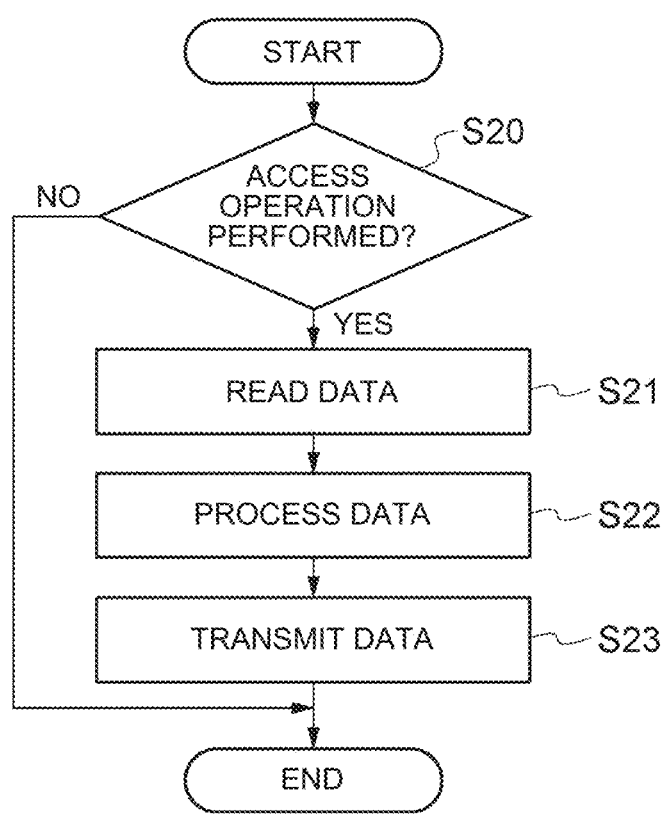
FIG. 10 is a flowchart showing processes executed by a fourth server.

When the determination result is No in S20 or when the process in S23 is completed, the fourth CPU temporarily ends the process of the flowchart shown in FIG. 10.

Next, the flow of processes executed by the CPU of the mobile terminal 50 (hereinafter referred to as a terminal CPU) will be described using the flowchart in FIG. 11. The terminal CPU repeatedly executes the process of the flowchart shown in FIG. 11 every time a predetermined time elapses.

First, in S30, the terminal CPU determines whether the driving diagnostic display application is running.

When the determination result is Yes in S30, the terminal CPU proceeds to S31 and determines whether the communication I/F of the mobile terminal 50 receives the data representing the driving diagnostic result image 55 from the communication I/F of the fourth server 18.

When the determination result is Yes in S31, the terminal CPU proceeds to S32 and causes the display unit 51 to display the driving diagnostic result image 55.

Figure 12:
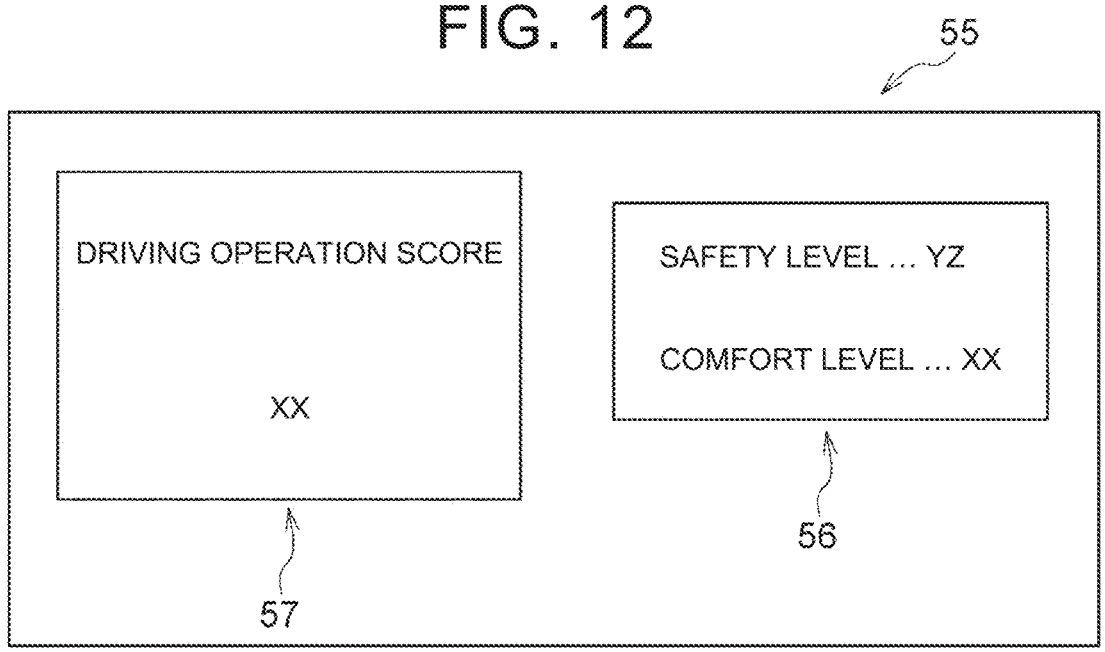
FIG. 12 is a diagram showing an image displayed on a display unit of the mobile terminal.

As shown in FIG. 12, the driving diagnostic result image 55 includes a safety-comfort level display unit 56 and a score display unit 57. The safety level score and the comfort level score are displayed on the safety-comfort level display unit 56. The driving operation score is displayed on the score display unit 57.

Figure 11:
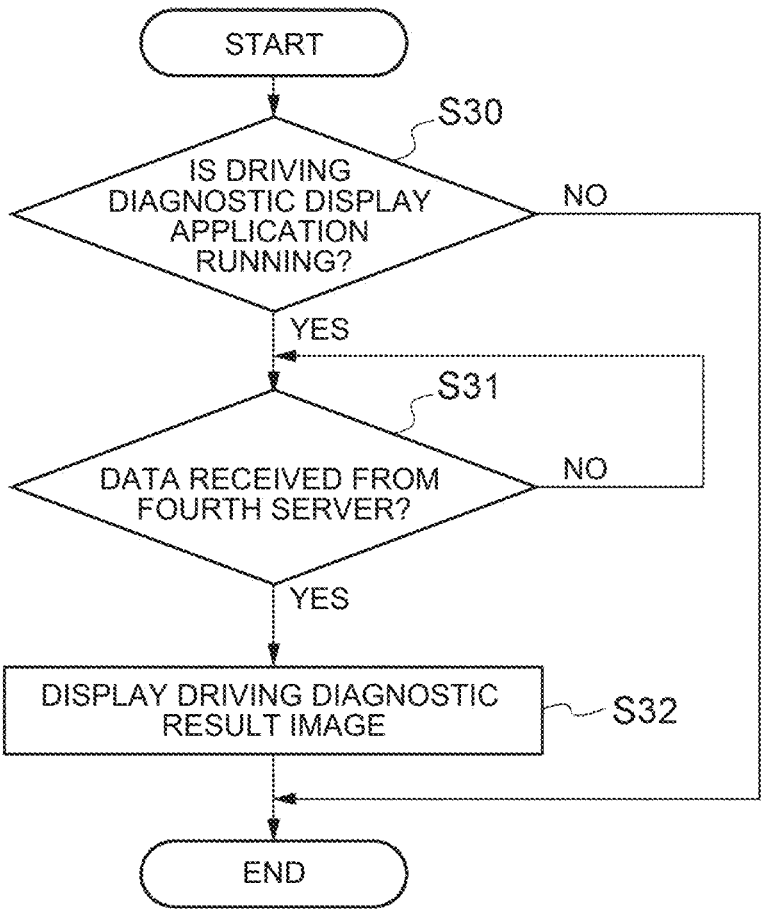
FIG. 11 is a flowchart showing processes executed by the mobile terminal shown in FIG. 2.

When the determination result is No in S30 or when the process in S32 is completed, the terminal CPU temporarily ends the process of the flowchart shown in FIG. 11.

As described above, in the present embodiment, the driving diagnostics related to the operation of the shift lever 33 is performed based on the maximum value of the duration that is the time in which the vehicle speed of the vehicle 30 in the specific time period Ts continues to be the first threshold value or less and the second threshold value. As described above, it is conceivable that, when the maximum value of the duration in the specific time period Ts is the second threshold value or more, the driver is highly likely to check the rear for a sufficient period of time before the driver moves the shift lever 33 to the R range, after the driver moves the shift lever 33 to the R range, or while the driver is moving the shift lever 33 to the R range. That is, when the maximum value of the duration is the second threshold value or more, a determination can be made that the driver is highly likely to perform a reverse operation with a high degree of safety. As described above, the vehicle 30 according to the present embodiment can perform the driving diagnostics when a reverse operation is performed, by a simple method without using a camera or the like. In other words, even though the vehicle 30 does not include a drive recorder system with a camera or the like, it is possible to perform the driving diagnostics when the reverse operation is performed.

Further, in the present embodiment, the driving diagnostics is performed using the driving operation score (KPI). Therefore, the driver who views the driving diagnostic result image 55 can easily recognize the characteristics of the driving operation by the driver.

Further, the KPI acquisition unit 143 calculates the KPI using only the specific detection value in the detection value data group. Thus, a calculation load of the KPI acquisition unit 143 is smaller than that in the case where the KPI calculation is performed using all of the detection value data groups. Therefore, the calculation load of the driving diagnostic device 10 is small.

Although the driving diagnostic device 10, the system 100, the driving diagnostic method, and the storage medium have been described above, the design thereof can be appropriately modified without departing from the scope of the present disclosure.

Figure 13:
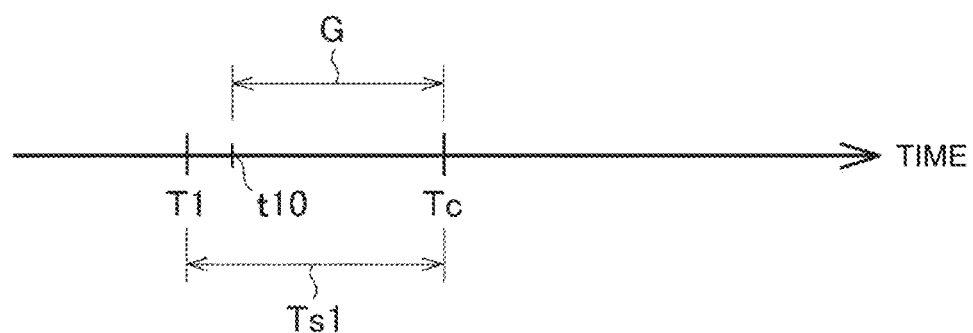
FIG. 13 is a diagram of a first modification similar to FIG. 6.

For example, the present disclosure may be implemented in the form of a first modification shown in FIG. 13. In the first modification, the KPI acquisition unit 143 compares the maximum value of the duration in a specific time period Ts1 that is the time period between the first time T1 and the switching time Tc with the second threshold value. In the example of FIG. 13, the length of a time period G between time t10 after the first time T1 and the switching time Tc is the maximum value of the duration. When the KPI acquisition unit 143 determines that the length of the time period G is the second threshold value or more, it is highly likely that the driver of the vehicle 30 visually checks the rear in the time period G. That is, it is highly likely that the driver moves the shift lever 33 to the R range after the driver substantially performs the visual check of the rear for a sufficient period of time. Note that, in this case, it is assumed that the vehicle 30 moves in reverse due to the accelerator pedal 30A being depressed or a creep phenomenon at and after the switching time Tc, and further, the brake pedal 30B is depressed thereafter.

Figure 14:
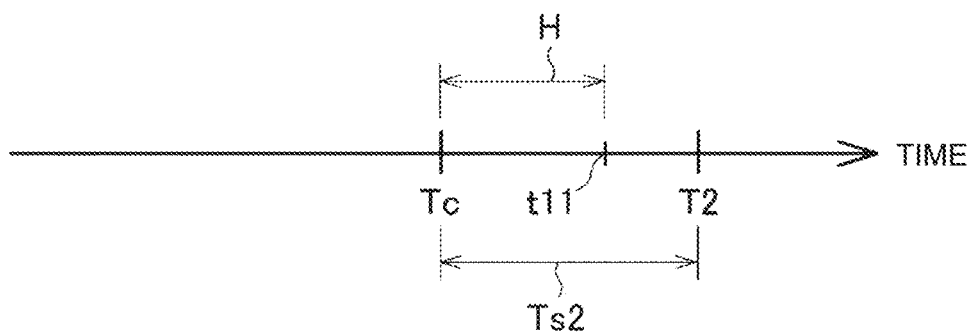
FIG. 14 is a diagram of a second modification similar to FIG. 6.

Further, the present disclosure may be implemented in the form of a second modification shown in FIG. 14. In the second modification, the KPI acquisition unit 143 compares the maximum value of the duration in a specific time period Ts2 that is the time period between the switching time Tc and the second time T2 with the second threshold value. In the example of FIG. 14, the length of a time period H between the switching time Tc and time t11 after the switching time Tc is the maximum value of the duration. When the KPI acquisition unit 143 determines that the length of the time period H is the second threshold value or more, it is highly likely that the driver of the vehicle 30 visually checks the rear during the time period H. That is, it is highly likely that the driver performs the visual check of the rear for a sufficient period of time after the driver moves the shift lever 33 to the R range. Note that, in this case, it is assumed that the vehicle 30 moves in reverse due to the accelerator pedal 30A being depressed or a creep phenomenon at and after the time t11, and further, the brake pedal 30B is depressed thereafter.

The driving diagnostic device 10 may be implemented with a configuration different from the above. For example, the first server 12, the second server 14, the third server 16, and the fourth server 18 may be realized by one server. In this case, the inside of the server may be virtually divided into areas corresponding to the first server 12, the second server 14, the third server 16, and the fourth server 18 using, for example, a hypervisor.

The driving diagnostic device 10 does not have to be connected to the Internet. In this case, for example, the detection value data group acquired from the vehicle is recorded on a portable recording medium (for example, a USB), and the detection value data group in the recording medium is copied to the first server 12.

Instead of the GPS receiver 35, the vehicle 30 may include a receiver capable of receiving information from satellites of a global navigation satellite system (for example, Galileo) other than GPS.

The ECU 31 of the vehicle 30 may have functions corresponding to the scene extraction unit 142, the KPI acquisition unit 143, and the score calculation unit 144. That is, the ECU 31 may have a function as the driving diagnostic unit.

The driving diagnostic result image 55 may include an image representing a result of the driving diagnostics for each reverse operation. Furthermore, this image may include time information representing the time at which the reverse operation is performed and the position information representing the position at which the reverse operation is performed. Still further, the driving diagnostic result image 55 may include map data, and the map data may include information representing the time and position at which each reverse operation is performed. With the above, the driver who sees the driving diagnostic result image 55 displayed on the display unit 51 can recognize the time and position of the reverse operation performed by the driver.

APPENDIX

A driving diagnostic device according to the present disclosure may be any combination of first to fourth configurations below.

<First configuration> A driving diagnostic device includes a driving diagnostic unit that performs driving diagnostics related to a reverse operation of a vehicle based on a maximum value of a duration and a second threshold value, the duration being a time during which a vehicle speed of the vehicle in at least one of a time period between a first time before a switching time at which a shift lever of the vehicle is moved from a shift position other than an R range to the R range by a predetermined time and the switching time and a time period between a second time after the switching time by a predetermined time and the switching time continues to be a first threshold value or less.

<Second configuration> In the driving diagnostic device, the driving diagnostic unit performs the driving diagnostics based on the maximum value in a time period between the first time and the second time and the second threshold value.

<Third configuration> In the driving diagnostic device, the driving diagnostic unit performs the driving diagnostics based on the maximum value in a time period between the first time and the switching time and the second threshold value.

<Fourth configuration> In the driving diagnostic device, the driving diagnostic unit performs the driving diagnostics based on the maximum value in a time period between the switching time and the second time and the second threshold value.

Further, a driving diagnostic system according to the present disclosure may be a combination of a fifth configuration below and at least one of the first to fourth configurations.

<Fifth configuration> A driving diagnostic system includes: a shift position sensor that detects a shift position of the shift lever; a vehicle speed sensor that detects the vehicle speed; and the driving diagnostic unit.

Further, a driving diagnostic method according to the present disclosure may be a combination of a sixth configuration below and at least one of the first to fourth configurations.

<Sixth configuration> A driving diagnostic method includes a step of performing driving diagnostics related to a reverse operation of a vehicle based on a maximum value of a duration and a second threshold value, the duration being a time during which a vehicle speed of the vehicle in at least one of a time period between a first time before a switching time at which a shift lever of the vehicle is moved from a shift position other than an R range to the R range by a predetermined time and the switching time and a time period between a second time after the switching time by a predetermined time and the switching time continues to be a first threshold value or less.

Further, a storage medium according to the present disclosure may be a combination of a seventh configuration below and at least one of the first to fourth configurations.

<Seventh configuration> A storage medium stores a program that causes a computer to execute a process of performing driving diagnostics related to a reverse operation of a vehicle based on a maximum value of a duration and a second threshold value, the duration being a time during which a vehicle speed of the vehicle in at least one of a time period between a first time before a switching time at which a shift lever of the vehicle is moved from a shift position other than an R range to the R range by a predetermined time and the switching time and a time period between a second time after the switching time by a predetermined time and the switching time continues to be a first threshold value or less.

What is claimed is:

1. A driving diagnostic device comprising a driving diagnostic unit that performs driving diagnostics related to a reverse operation of a vehicle based on a maximum value of a duration and a second threshold value, the duration being a time during which a vehicle speed of the vehicle continues to be a first threshold value or less in at least one of a time period between a first time before a switching time, at which a shift lever of the vehicle is moved from a shift position other than an R range to the R range, by a first predetermined time and the switching time, and a time period between a second time after the switching time by a second predetermined time and the switching time.

2. The driving diagnostic device according to claim 1, wherein the driving diagnostic unit performs the driving diagnostics based on the maximum value in a time period between the first time and the second time, and the second threshold value.

3. The driving diagnostic device according to claim 1, wherein the driving diagnostic unit performs the driving diagnostics based on the maximum value in a time period between the first time and the switching time, and the second threshold value.

4. The driving diagnostic device according to claim 1, wherein the driving diagnostic unit performs the driving diagnostics based on the maximum value in a time period between the switching time and the second time, and the second threshold value.

5. A driving diagnostic system comprising:
a shift position sensor that detects the shift position of the shift lever;
a vehicle speed sensor that detects the vehicle speed; and
the driving diagnostic unit according to claim 1.

6. A driving diagnostic method executed by one or more processors, the driving diagnostic method comprising:
comparing a maximum value of a duration and a second threshold value, the duration being a time during which a vehicle speed of the vehicle continues to be a first threshold value or less in at least one of a time period between a first time before a switching time, at which a shift lever of the vehicle is moved from a shift position other than an R range to the R range, by a first predetermined time and the switching time, and a time period between a second time after the switching time by a second predetermined time and the switching time; and
performing driving diagnostics related to a reverse operation of the vehicle based on a result of the comparison.

7. A non-transitory storage medium storing instructions that are executable by one or more processors and that cause the one or more processors to perform functions comprising:
comparing a maximum value of a duration and a second threshold value, the duration being a time during which a vehicle speed of the vehicle continues to be a first threshold value or less in at least one of a time period between a first time before a switching time, at which a shift lever of the vehicle is moved from a shift position other than an R range to the R range, by a first predetermined time and the switching time, and a time period between a second time after the switching time by a second predetermined time and the switching time; and performing driving diagnostics related to a reverse operation of the vehicle based on a result of the comparison.

\* \* \* \* \*